(12) United States Patent
Kobayashi et al.

(10) Patent No.: US 6,472,043 B1
(45) Date of Patent: Oct. 29, 2002

(54) SHOCK ABSORBER

(75) Inventors: Eiji Kobayashi; Toshikazu Takatsudo; Yoichi Kawashima, all of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/482,567

(22) Filed: Jan. 14, 2000

(30) Foreign Application Priority Data

Jan. 18, 1999 (JP) .......................................... 11-009001

(51) Int. Cl.⁷ .................................................. B32B 3/12
(52) U.S. Cl. ........................................ 428/116; 428/593
(58) Field of Search ................................ 428/116, 117, 428/118, 73, 593

(56) References Cited

U.S. PATENT DOCUMENTS 5,250,362 A * 10/1993 Hama et al.
5,496,610 A * 3/1996 Landi et al.
5,804,030 A * 9/1998 Jaegers et al.

FOREIGN PATENT DOCUMENTS

| EP | 0 863 056 | 9/1998 |
| GB | 2 305 487 | 4/1997 |
| GB | 2 323 146 | 9/1998 |

* cited by examiner

*Primary Examiner*—Deborah Jones
*Assistant Examiner*—Wendy Boss
(74) *Attorney, Agent, or Firm*—Finnegan, Henderson, Farabow, Garrett & Dunner, L.L.P.

(57) ABSTRACT

A shock absorber comprising a honeycomb block with a plurality of cylindrical cell arranged in parallel, wherein the strength of said honeycomb block to withstand the load in the cell axial direction is adjusted by a processed configuration of said cells.

8 Claims, 6 Drawing Sheets

FIG.1(a)
FIG.1(b)
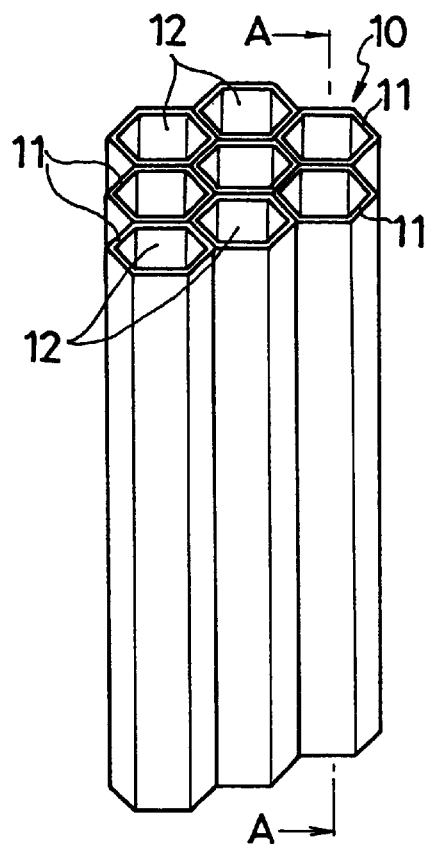
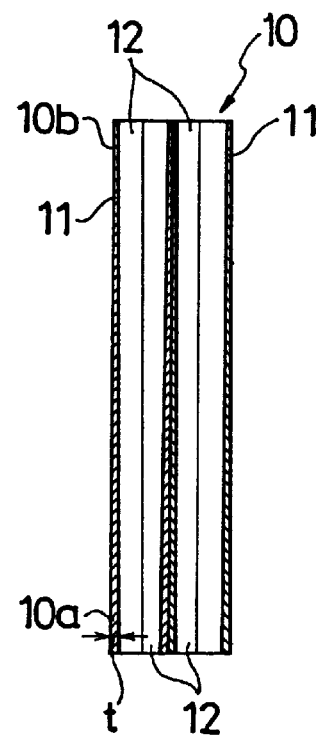
FIG.2
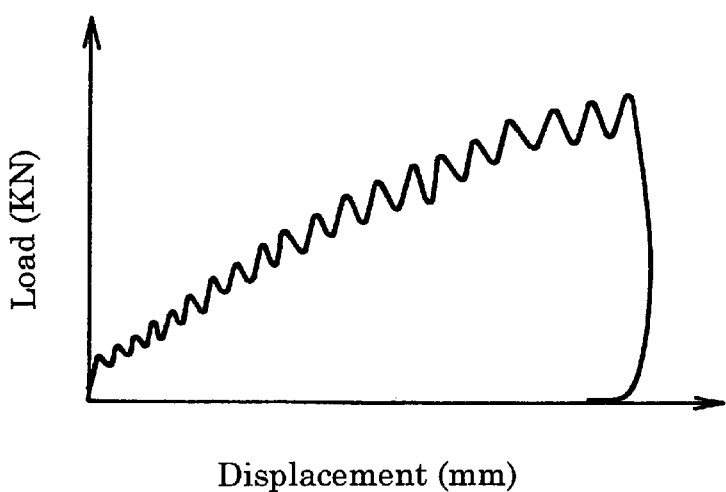

FIG.4
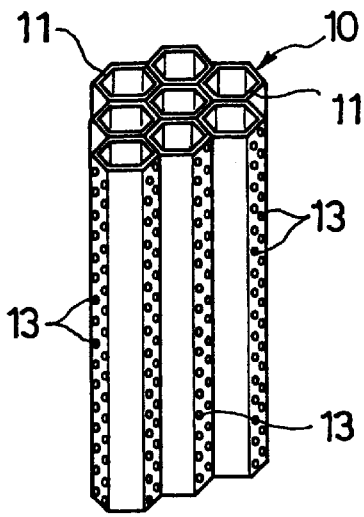
FIG.5(a) FIG.5(b) FIG.5(c) FIG.5(d) FIG.5(e)
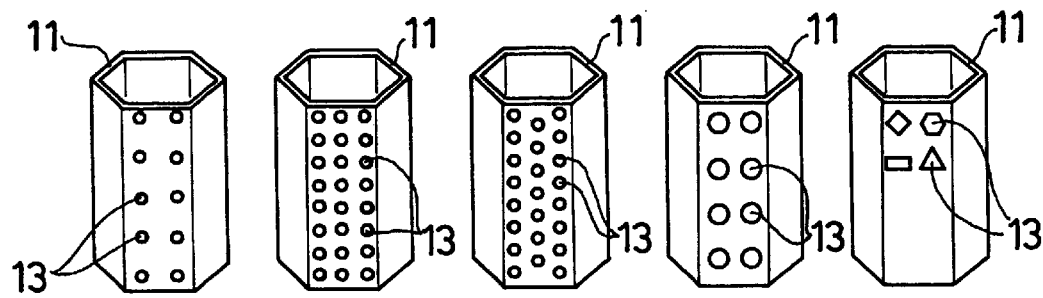
FIG.6(a) FIG.6(b)
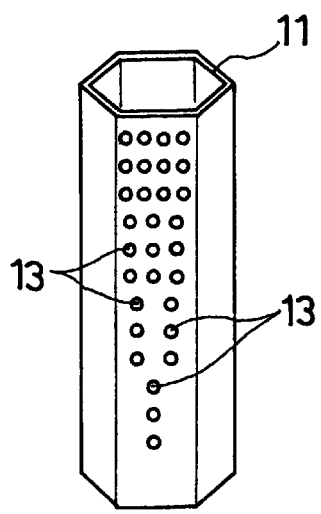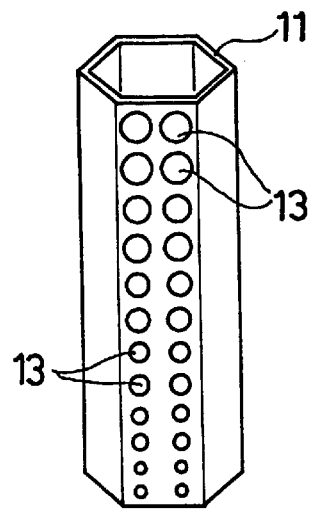

SHOCK ABSORBER

BACKGROUND OF THE INVENTION

The present invention relates to a shock absorber using a honeycomb block, and more specifically to a shock absorber wherein the degree of freedom of honeycomb design is improved.

It is a known fact that shock absorbers each of which comprises a lamination of plural honeycomb blocks are used as crash test members or shock absorbing members for automobiles. When such a shock absorber comprising honeycomb blocks is used in a crash test for an automobile, it is necessary that the shock absorbing characteristic satisfies requirements specified by laws and regulations. Namely, in the shock absorbing characteristics, it is assumed that the front of an automobile has a certain quantity of rigidity, which causes the load to rise with increasing amount of deformation. Furthermore, the upper and lower limits of the load corresponding to an arbitrary amount of deformation are established, and it is required that the load should not exceed said limits.

A shock absorber according to prior art using honeycomb blocks is constructed, as shown in FIG. 9 for example, such that plural honeycomb blocks 1 comprising a cell opening 1a at the front and at the rear is laminated by inserting in-between intermediate plates 2 each of which consists of a metallic plate or the like. In the case of this shock absorber, the strength of each honeycomb block 1 is changed in stages for the purpose of adjusting the shock absorbing characteristics (reaction force characteristics). In each of said intermediate plates 2, a large number of vent holes 3 are formed to ensure ventilation between the interior and the exterior of the honeycomb block 1. Moreover, besides the above, a shock absorber wherein intermediate plates 2a having no vent holes 3 are inserted in-between as shown in FIG. 10 is also known.

However, in the case of the shock absorber described above wherein plural honeycomb blocks 1 are laminated, the load increases in stages with respect to the displacement of the shock absorber as shown in FIG. 11, since the strength varies abruptly between adjacent honeycomb blocks, and therefore it has been difficult to moderate the load variation. Moreover, if the length of each honeycomb block is reduced and the number of laminated honeycomb blocks 1 is increased for the purpose of moderating the variation of strength between adjacent honeycomb blocks, a problem has been encountered in that the construction of the shock absorber becomes more complicated.

SUMMARY OF THE INVENTION

The object of the present invention is to provide a shock absorber wherein it is possible to design arbitrary shock absorbing characteristics in spite of the fact that the construction is simple.

The shock absorber of the present invention for achieving the object comprises a honeycomb block with plural cylindrical cells arranged in parallel, wherein the strength of the honeycomb block to withstand a load in the cell axial direction is adjusted by a processed configuration of the cells.

Since the strength of the honeycomb block to withstand the load in the cell axial direction is adjusted by the processed configuration of the cells, it is possible to design arbitrary shock absorbing characteristics in spite of the fact that the construction is simple. Particularly, if the strength of the honeycomb block to withstand the load in the cell axial direction is gradually reduced from one axial end of each cell to the other axial end, and if the shock load is designed to be applied from the other end of said honeycomb block, the load rises with increasing amount of deformation of the shock absorber, thereby easily realizing the shock absorbing characteristics which correspond to the rigidity of the front of an automobile.

A thinning process, a metallic plating process or a punching process can be utilized as the method of processing of the cell. Particularly, when a combination of a punching process, and one of a thinning process and a metallic plating process is utilized, it is possible to arrange a desired shock absorbing characteristics with accuracy. The thinning process is a process in which the thickness of each sidewall of the cell is reduced, thereby making it possible to adjust the strength of the honeycomb block to withstand the load in the cell axial direction, on the basis of the sidewall thickness of said cell. The metallic plating process is a process in which a metallic plating layer is provided on each sidewall of the cell, thereby making it possible to adjust the strength of the honeycomb block to withstand the load in the cell axial direction, on the basis of the thickness of the metallic plating layer. The punching process is a process in which plural through holes are provided in each sidewall of the cell, thereby making it possible to adjust the strength of the honeycomb block to withstand the load in the cell axial direction, on the basis of at least one factor chosen from among the density, the arrangement, the size, and the shape of the through holes.

In the case of adjusting the strength by means of through holes, it becomes possible to establish more moderate strength variation along the cell axis if a plurality of hole rows each of which comprises plural through holes arranged axially in the sidewall of the cell is provided, and if any arbitrary through hole in an arbitrary hole row is positioned between a pair of adjacent through holes along the cell axis in another hole row. Particularly, it is good practice to arrange plural through holes such that any arbitrary plane perpendicular to the cell axis passes through at least one through hole.

BRIEF DESCRIPTION OF THE DRAWINGS

FIG. 1(a) and FIG. 1(b) show a shock absorber comprising the first embodiment configuration of the present invention, FIG. 1(a) being a view of the shack absorber as seen diagonally from above, and FIG. 1(b) being the cross-sectional view A—A of FIG. 1(a).

FIG. 2 shows a graph indicating the shock absorbing characteristics (reaction force characteristics) of a shock absorber comprising the first embodiment configuration of the present invention, the axis of abscissa showing the displacement due to the load, and the axis of ordinate showing the load.

FIG. 4 shows a view, as seen diagonally from above, of a shock absorber comprising the third embodiment configuration of the present invention.

Each of FIG. 5(a) through FIG. 5(e) is a view, as seen diagonally from above, of an example of variants of a cell which is a component of a shock absorber comprising the third embodiment configuration of the present invention.

Each of FIG. 6(a) and FIG. 6(b) shows a view, as seen diagonally from above, of another example of variants of a cell which is a component of a shock absorber comprising the third embodiment of the present invention.

Figure 7A:
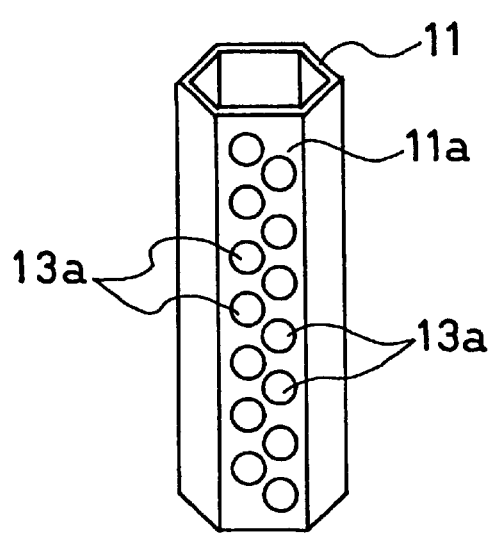
Figure 7B:
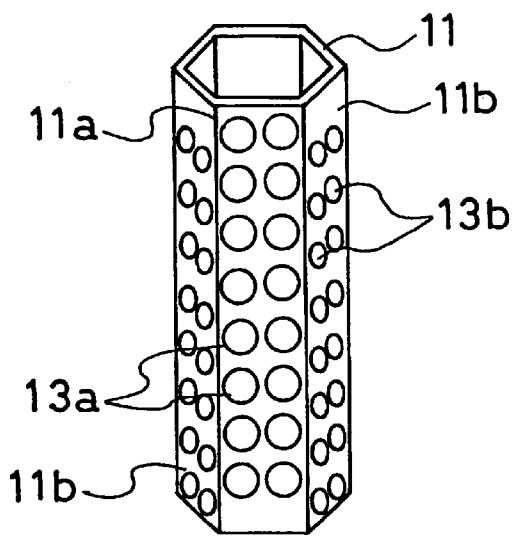
Figure 7C:
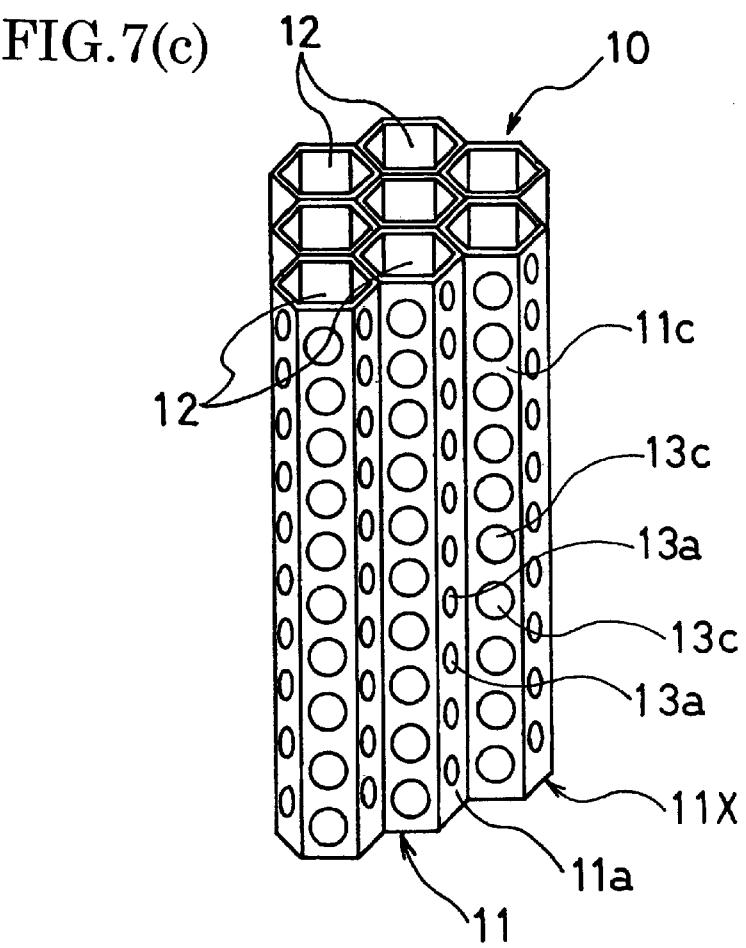

Each of FIG. 7(a) through FIG. 7(c) shows a view, as seen diagonally from above, of yet another example of variants of a cell which is q component of a shock absorber comprising the third embodiment of the present invention.

Figure 8A:
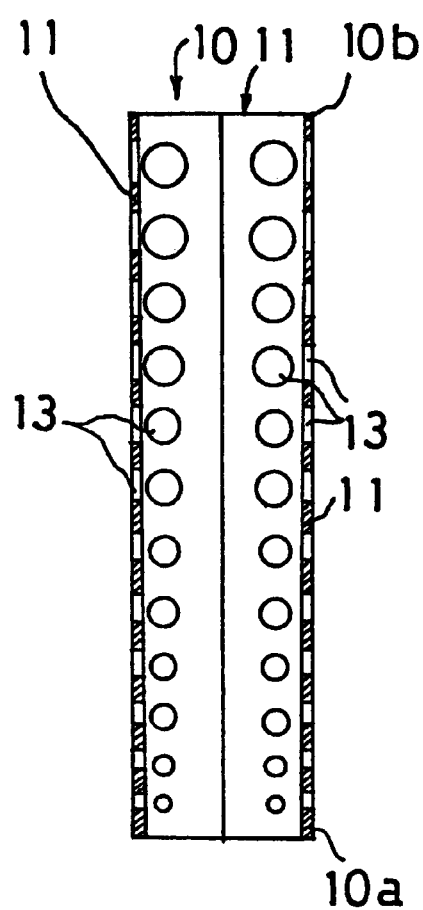
Figure 8B:
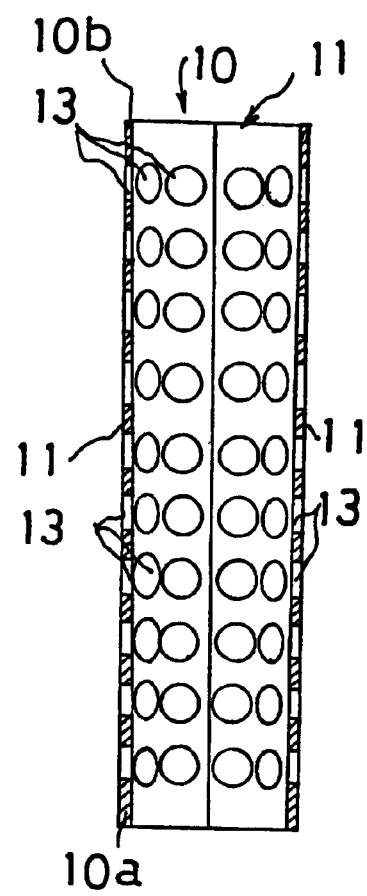

Each of FIG. 8(a) and FIG. 8(b) shows a cross-sectional view of a cell which is component of a shock absorber comprising the forth embodiment of the present invention.

Figure 9:
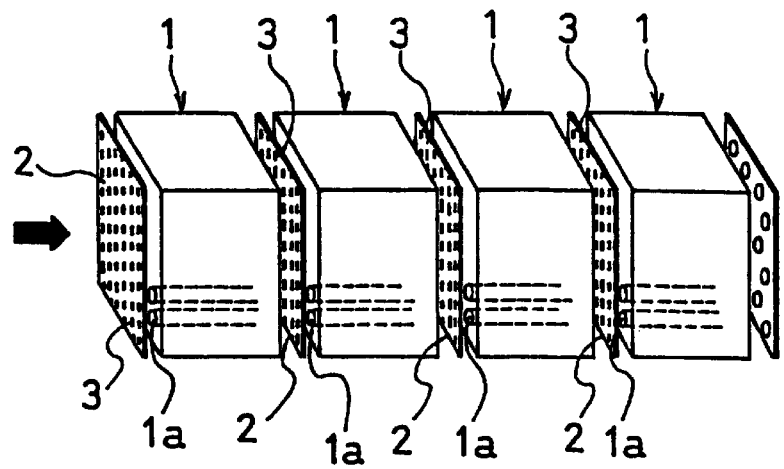

FIG. 9 shows an exploded view, as seen diagonally from above, of a conventional shock absorber.

Figure 10:
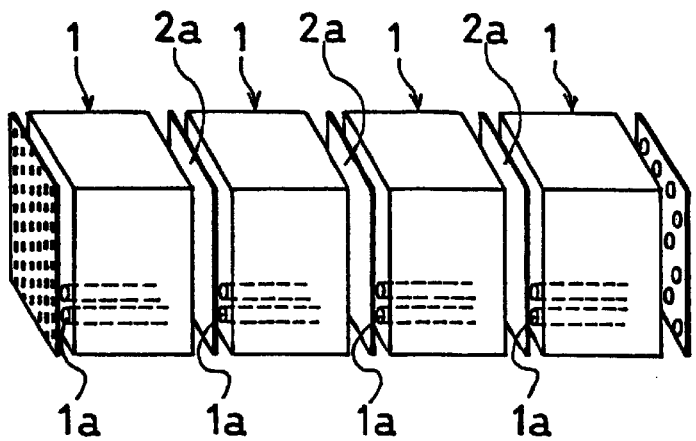

FIG. 10 shows an exploded view, as seen diagonally from above, of another conventional shock absorber.

Figure 11:
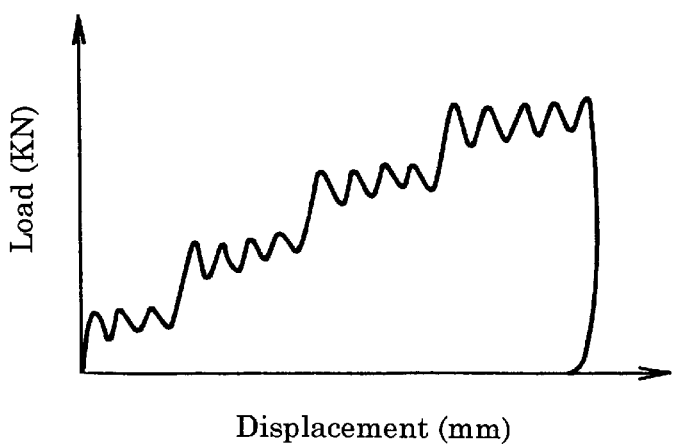

FIG. 11 shows a graph indicating the shock absorbing characteristics (reaction force characteristics) of a conventional shock absorber, the axis of abscissa showing the displacement due to the load, and the axis of ordinate showing the load.

DETAILED DESCRIPTION OF THE PREFERRED EMBODIMENTS

FIG. 1(a) and FIG. 1(b) show a shock absorber comprising the first embodiment configuration of the present invention. In this figure, a honeycomb block 10 is constructed such that plural cells 11 are arranged in parallel. This honeycomb block 10 may be composed of a material capable of being subjected to plastic deformation such as a metallic material (for example, aluminum material) or a resin material. Moreover, an opening 12 is formed at each axial end of cell 11.

In the case of the honeycomb block 10 in the first embodiment configuration, the thickness t of cell 11 is reduced continuously or in stages from one axial end 10a (lower end) of the cell toward the other axial end 10b (upper end) in order that the strength to withstand the load in the cell axial direction will be reduced gradually from one end 10a toward the other end 10b. As regards the means to change the thickness t of cell 11, a processing means such as etching may be used.

As described above, the strength of the honeycomb block 10 to withstand the load in the cell axial direction is adjusted on the basis of the thickness t of each sidewall of the cell 11 by changing the thickness t of each sidewall of the cell 11 along the cell axis. Therefore, it is possible to design arbitrary shock absorbing characteristics in spite of the fact that this shock absorber has a simple construction comprising a single honeycomb block 10. Particularly, in the case of said strength distribution, if impact load is designed to be applied from the other end 10b of the honeycomb block 10, the load rises with increasing amount of deformation of the shock absorber, as shown in FIG. 2, thereby easily realizing shock absorbing characteristics which correspond to the rigidity of the front of an automobile.

Figure 3A:
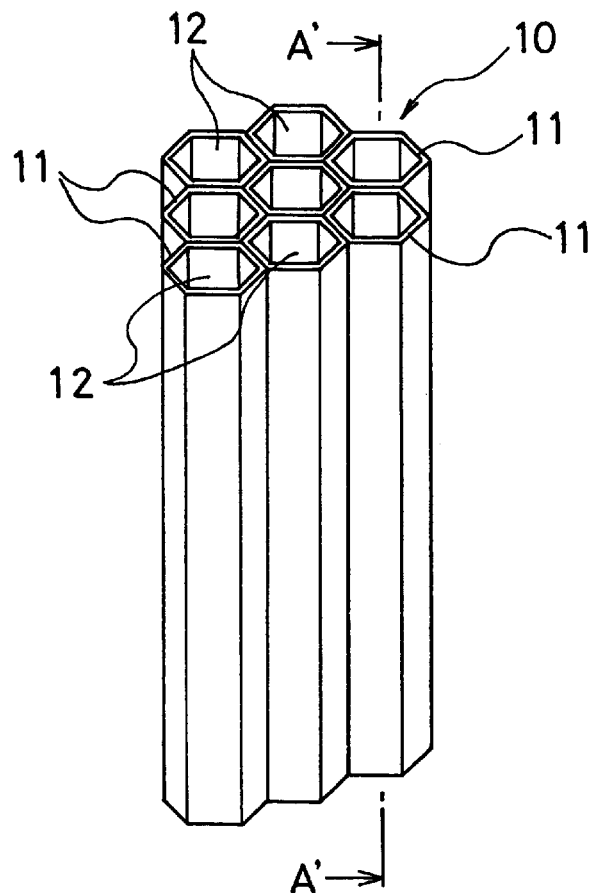
FIG. 3(a) through FIG. 3(c) show a shock absorber comprising the second embodiment configuration of the present invention, FIG. 3(a) being a view of the shack absorber as seen diagonally from above, FIG. 3(b) being the cross-sectional view A'—A' of FIG. 3(a), and FIG. 3(c) being the enlarged cross-sectional view of detail B of FIG. 3(b).
Figure 3B:
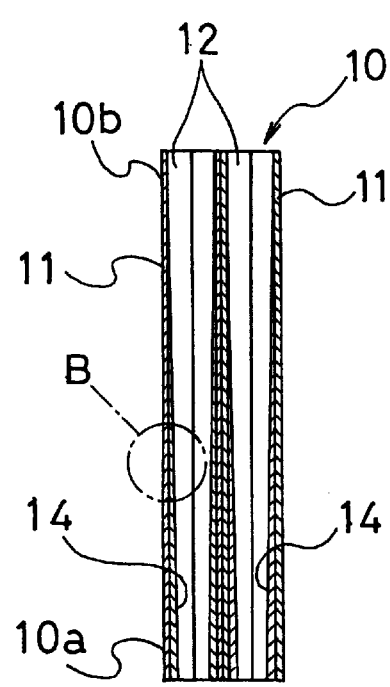
Figure 3C:
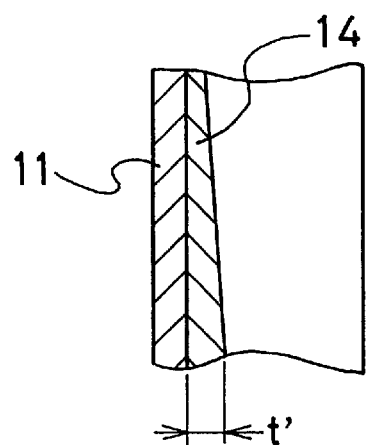

FIG. 3(a) through FIG. 3(c) show a shock absorber comprising the second embodiment configuration of the present invention. In the case of the honeycomb block 10 of the second embodiment configuration, a metallic plating layer 14 is provided on part or the whole of each sidewall of the cell 11, and the thickness t' of this metallic plating layer 14 is reduced continuously or in stages in order that the strength to withstand the load in the cell axial direction will be reduced gradually from one axial end 10a (lower end) of the cell toward the other axial end 10b (upper end).

As described above, by providing the metallic plating layer 14 on each sidewall of the cell 11, and by changing the thickness t' of said metallic plating layer along the cell axis, the strength of the honeycomb block 10 to withstand the load in the cell axial direction is adjusted on the basis of the thickness t' of the metallic plating layer. Therefore, it is possible to design arbitrary shock absorbing characteristics in spite of the fact that this shock absorber has a simple construction comprising a single honeycomb block 10. Particularly, in the case of said strength distribution, it is possible to easily realize shock absorbing characteristics which correspond to the rigidity of the front of an automobile, as in the case of the first embodiment configuration.

FIG. 4 shows a shock absorber comprising the third embodiment configuration of the present invention. In the case of the honeycomb block 10 of the third embodiment configuration, plural through holes 13 are provided on each sidewall of the cell 11, and the strength to withstand the load in the cell axial direction is adjusted by forming these through holes 13. In this case, the adjustment of the strength of the honeycomb block 10 may be carried out on the basis of factors such as the density, the arrangement, the size, and the shape of thorough holes 13. For example, if the cell 11 in FIG. 5(a) is taken as the reference configuration, the density of the through holes 13 may be adjusted as shown in FIG. 5(b), the arrangement of the through holes 13 may be adjusted as shown in FIG. 5(c), the diameter of each of the through holes 13 may be adjusted as shown in FIG. 5(d), or the shapes of the through holes 13 may be adjusted as shown in FIG. 5(e).

As described above, by providing plural through holes 13 in each sidewall of the cell 11, the strength of the honeycomb block 11 to withstand the load in the cell axial direction is adjusted on the basis of at least one factor chosen from among the density, the arrangement, the size, and the shape of said through holes 13. Therefore, it is possible to design arbitrary shock absorbing characteristics in spite of the fact that this shock absorber has a simple construction comprising a single honeycomb block 10.

Furthermore, in order that the strength of the honeycomb block 10 to withstand the load in the cell axial direction will be gradually reduced from one axial end of the cell toward the other axial end, it is also possible to gradually increase the number of through holes 13 from one axial end of the cell toward the other axial end as shown in FIG. 6(a), or to gradually increase the diameters of through holes 13 from one axial end of the cell toward the other axial end as shown in FIG. 6(b). In the case of said strength distribution, it is possible to easily realize shock absorbing characteristics which correspond to the rigidity of the front of an automobile, as in the case of the first embodiment configuration.

In the case of adjusting the strength by means of the through holes 13, it is good practice if a plurality of hole rows each of which comprises plural through holes 13 arranged axially in each sidewall of the cell 11 is provided and if any arbitrary through hole 13 in an arbitrary hole row is positioned between a pair of adjacent through holes 13 and 13 along the cell axis in another hole row.

Namely, in the cell structure shown in FIG. 7(a), plural hole rows each of which comprises plural through holes 13a are provided in an arbitrary sidewall 11a of the cell 11, and any arbitrary through hole 13a in an arbitrary hole row in the sidewall 11a is positioned between a pair of adjacent through holes 13a and 13a along the cell axis in another hole row in the sidewall 11a.

In the cell structure shown in FIG. 7(b), hole rows each of which comprises plural through holes 13a are provided in an arbitrary sidewall 11a of the cell 11, and likewise hole rows each of which comprises plural through holes 13b are provided in another sidewall 11b, and furthermore any arbitrary through hole 13a in a hole row in the sidewall 11a is positioned between a pair of adjacent through holes 13b and 13b along the cell axis in a hole row in the sidewall 11b.

In the cell structure shown in FIG. 7(c), hole rows each of which comprises plural through holes 13a are provided in an arbitrary sidewall 11a of the cell 11, and likewise hole rows each of which comprises plural through holes 13c are provided in an arbitrary sidewall 11c of another cell 11x, and furthermore any arbitrary through hole 13a in a hole row in the sidewall 11a is positioned between a pair of adjacent through holes 13c and 13c along the cell axis in a hole row in the sidewall 11c.

As described above, if plural hole rows each of which comprises plural through holes 13 are provided on each sidewall of the cell 11, and if any arbitrary through hole 13 in an arbitrary hole row is positioned between a pair of adjacent through holes 13 and 13 along the cell axis in another hole row, plural through holes 13 is continuously crushed when a load is applied axially to the shock absorber, and therefore it is possible to moderate the variation of strength along the cell axis and to linearize the relationship between the load and the displacement. Particularly, if plural through holes 13 is overlapped in the direction of the cell axis such that any arbitrary plane perpendicular to the cell axis passes through at least one through hole 13, it is possible to more closely linearize the relationship between the load and the displacement.

FIG. 8(a) and FIG. 8(b) show shock absorbers comprising the forth embodiment configuration of the present invention. In those embodiments, the processed configuration of the cells is given by a combination of a thinning process and a punching process. In the case of the embodiment shown in FIG. 8(a), the diameter of the through holes 13 formed in the sidewall of the cell 11 is increased gradually from the axial end 10a toward the other axial end 10b while the thickness of the cell 11 is reduced gradually from the axial end 10a toward the other axial end 10b. In the case of the embodiment shown in FIG. 8(b), the diameter of the through holes 13 formed in the sidewall of the cell 11 is constant while the thickness of the cell 11 is reduced gradually from the axial end 10a toward the other axial end 10b. As an another embodiment, the diameter of the through holes 13 formed in the sidewall of the cell 11 may be constant while the thickness of the cell 11 is reduced equally along the sidewall.

According to the punching process, although the strength of the honeycomb block can be easily lowered by large amount, fine adjustment of the strength would be difficult. On the other hand, according to the thinning process, fine adjustment of the strength would be easier. Therefore, if the punching process is applied to the honeycomb block, followed by the thinning process, a desired shock absorbing characteristics would be obtained with accuracy. Moreover, similar effect can be obtained through a combination of a metallic plating process and a punching process.

What is claimed is:

1. A shock absorber for use in automotive crash testing, comprising a honeycomb block with a plurality of cylindrical cells arranged in parallel and each having opposite axial ends, wherein the strength of said honeycomb block to withstand a load in the cell axial direction is gradually reduced by a processed configuration of said cells from one axial end of each cell toward the other axial end of each cell, said processed configuration of said cells comprising one of a thinning process and a metallic plating process.

2. A shock absorber according to claim 1, wherein said honeycomb block comprises one of a metallic material and a resin material.

3. A shock absorber according to claim 1, wherein the processed configuration of said cells is given by a combination of a punching process, and one of a thinning process and a metallic plating process.

4. A shock absorber according to claim 1 wherein each of said cells has plural sidewalls and said thinning process is a process in which the thickness of each of the plural side walls of the cell is reduced, thereby adjusting the strength of said honeycomb block to withstand the load in the cell axial direction, on the basis of the sidewall thickness of said cell.

5. A shock absorber according to claim 1 wherein each of said cells has plural sidewalls and said metallic plating process is a process in which a metallic plating layer is provided on each of the plural side walls of said cell, thereby adjusting the strength of said honeycomb block to withstand the load in the cell axial direction, on the basis of the thickness of said metallic plating layer.

6. A shock absorber according to claim 3 wherein each of said cells has plural sidewalls and said punching process is a process in which a plurality of through holes is provided in each of the plural side walls of said cell, thereby adjusting the strength of said honeycomb block to withstand the load in the cell axial direction, on the basis of at least one factor chosen from among the density, the arrangement, the size, and the shape of said through holes.

7. A shock absorber according to claim 6, wherein a plurality of hole rows each of which comprises a plurality of through holes arranged axially in each sidewall of said cell is provided, and wherein any arbitrary through hole in an arbitrary hole row is positioned between a pair of adjacent through holes in the cell axial direction in another hole row.

8. A shock absorber according to claim 7, wherein said plural through holes are arranged such that any arbitrary plane perpendicular to said cell axis passes through at least one through hole.

* * * * *